Dec. 4, 1962  P. H. PELLEY ETAL  3,067,021
SUBBING SURFACES
Filed Dec. 8, 1955

INVENTORS
PERRY H. PELLEY
LEWIS A. PAUL
BY
*John L. Diehl*
Attorney 3,067,021
SUBBING SURFACES
Perry H. Pelley and Lewis A. Paul, Wichita, Kans., assignors, by mesne assignments, to Wheelabrator Corporation, Mishawaka, Ind.
Filed Dec. 8, 1955, Ser. No. 551,886
1 Claim. (Cl. 51—328)

This application relates to a method of providing pencil and coating receptive surfaces on sheets and rolls of synthetic resin drafting material.

The last decade has seen the advent of many synthetic resin sheet materials in mapping, drafting, and graphic arts operations where formerly on paper and starch-cotton tracing cloth were utilized. Some of these materials, such as sheets of copolymeric vinyl chloride-acetate have found almost immediate acceptance in these industries because of their greater transparency and the ease with which subbing coatings and top coatings may be applied thereto which have a good bond to the surface. Other materials such as polyethylene terephthalate sold commercially in the United States by E. I. du Pont de Nemours as "Mylar" and glass fabric reinforced styrenated polyester sheets have found less ready acceptance despite their many advantages because of the difficulty of obtaining adherence of coatings to these materials.

A so called "base material" for drafting, mapping or graphic arts operations must exhibit great adherence to wide variety of coatings under widely varying conditions in order to be of substantial value in any one of these industries. This results from the fact that such base materials are used for many different reproduction and drafting operations. It generally must be possible first to apply to the base material an adherent coating containing a certain amount of fine and somewhat abrasive material in order to provide a rough surface which can be drawn upon with a pencil. Secondly, it is generally necessary that high adherence be exhibited for a coating which itself has sufficient adherence to india ink to prevent inked drawings from abrading or rubbing off the surface. Thirdly, it is desirable to be able to coat the base material with each of a number of light sensitive materials or to coat the base material with a coating (subbing or sub-coat) which exhibits high adhesion for the base material and to which a second coating, containing such photo-sensitive materials, may be applied with good bonding. A wide variety of photo-sensitive materials are used in the drafting, mapping and graphic arts industries in order to provide various sorts of prints and in order to make possible various sorts of reproduction processes. These include, for example, blue prints, ammonia developed diazo prints, water developed diazo prints, so-called Van Dyke prints, gum bichromate prints, sepia prints, and silver halide (photographic) negatives or prints.

In accordance with our invention we are able to provide an excellent subbing surface by the use of abrasive granules thrown by centrifugal throwing wheels oriented and operated in the manner hereinafter more fully described wherein abrasive granules are hurled upward at certain angles against the under surface of a sheet of drafting material comprising synthetic resin.

It is therefore an object of our invention to provide an improved subbing surface.

Another object is a method for providing upon a sheet of drafting material comprising synthetic resin a surface receptive to subbing and coating materials.

Another object is such a method for providing on such materials a surface which exhibits great adherence for subbing and coating materials and which is also receptive to pencil and ink.

Other objects will become apparent from the drawings and the following detailed description in which it is our intention to illustrate the applicability of the invention without thereby limiting its scope to less than that of all those equivalents which will be apparent to one skilled in the art.

In the drawings like reference numerals refer to like parts and:

Figure 1:
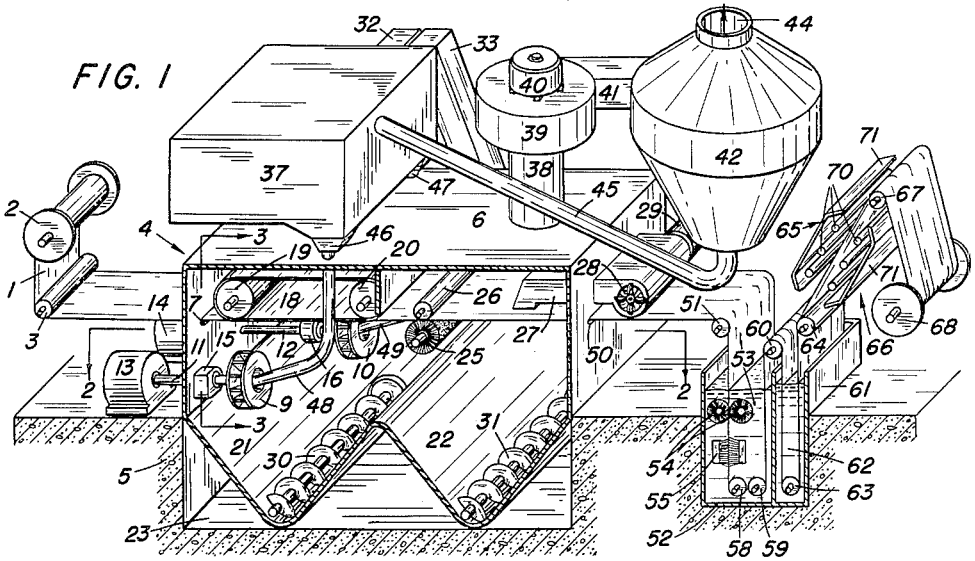
FIGURE 1 is a partially cutaway schematic perspective view of apparatus adapted to carry out the process according to our invention.
Figure 2:
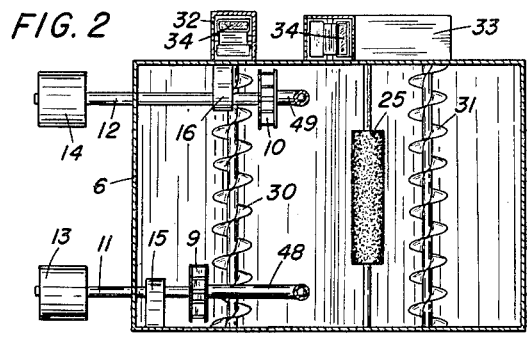
FIGURE 2 is a cross-sectional view from above of a portion of the apparatus of FIGURE 1 taken on lines 2—2 in FIGURE 1.
Figure 3:
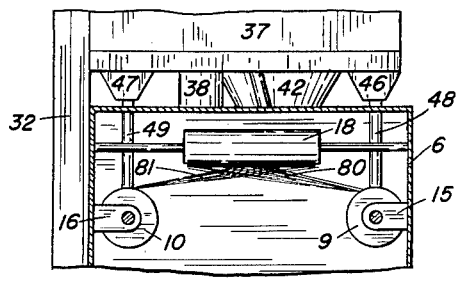
FIGURE 3 is a cross-sectional elevation of a portion of the apparatus of FIGURE 1 taken on lines 3—3 in FIGURE 1.

As shown in FIGURES 1, 2 and 3, a web of drafting material 1 travels from let-off roll 2 over idler-roll 3 and thence into an abrading machine indicated generally as 4 through slot 7 in housing 6 thereof. Sheet 1 may be of any suitable plastic sheet material and the process has been found particularly effective with films of thermoplastic polyester such as polyethylene terephthalate sold commercially in the United States by E. I. du Pont de Nemours as "Mylar" and also with polymerized styrenated polyester synthetic resin sheets reinforced with glass fibers. Contained within housing 6 are centrifugal throwing wheels 9 and 10 of the type well known in the art, which may be driven through shafts 11 and 12 by motors 13 and 14, the shafts being supported by bearings 15 and 16.

Web 1 may travel underneath and in conjunction with endless belt 18 which may travel over rollers 19 and 20, endless belt 18 being so located and driven by means not shown that its under-reach travels in the direction of web 1 at the same rate of speed as web 1 and provides a backing-up support for web 1 as abrasive is thrown upwardly thereagainst by wheel 9 and 10 in the manner more fully hereinafter described. The abrasive granules used may be sand, granulated silica, corn cob dust, etc. After abrasive granules have been thrown upwardly from wheels 9 and 10 against the under surface of web 1, they may fall downwardly into the bottom of housing 6 which may be provided with two hopperlike portions 21 and 22 which may extend downwardly into a suitable pit 23 provided in the concrete floor or support 5. Since a certain portion of the abrasive which contacts the under side of the web 1 adheres thereto, there may be provided a rotating brush 25 adapted to remove granules and there may be provided a backup roll 26 to hold web 1 against the rotating bristles thereof. Abrasive granules which fall on top of web 1 in stray or random fashion and remain there as a result of gravity may be removed by a blast of air issuing from duct 27 produced by blower 28 driven by motor 29.

Abrasive granules flowing into the hopper portions 21 and 22 may be removed therefrom by screw conveyors 30 and 31 leading to the bottom ends of vertical flight elevator 32 and inclined flight elevator 33. Each of these elevators may be provided with a suitable number of flights 34 mounted on an endless belt or chain in any suitable well-known manner such that abrasive is lifted by flights passing upwardly on one side of the elevator while empty flights pass downward on the other side of the elevator. At the top of elevators 32 and 33 the abrasive granules may be unloaded into storage bin 37 provided with a hopper shaped bottom.

Abrasive granules loosened from web 1 by brush 25 or the blast of air issuing from duct 27 and which are too light to fall easily into hopper portions 21 and 22 may be removed from the interior of housing 6 by being entrained in the air drawn upwardly through duct 38 by blower 39 driven by motor 40. The air and entrained granules drawn into blower 39 may be thence blown into cyclone separator 42 through duct 41. In cyclone separator 42 the air is separated from the entrained dust and air freed from dust may pass therefrom through duct 44; the abrasive granules may be carried to hopper 37 by means of a slight residual blast of air through duct 45. By means of suitable valves at the bottom-most portions 46 and 47 of bin 37, abrasive granules may be allowed to flow therefrom in metered streams by gravity through tubes 48 and 49 into the interior of the hubs of wheels 9 and 10 and the granules may there be further metered and fed to the blades of wheels 9 and 10 in any one of the several manners known in the art. Web 1 may be passed out of housing 6 through slot 50 therein and may thence pass over direction-changing roll 51 and into wash tank 52 containing a suitable soap or detergent solution 53. Within tank 52, web 1 may be cleansed by rotating brushes 54 and brushes 55 in order to remove dust and abrasive granules remaining thereon, and may pass thence over rolls 58, 59 and 60 into rinse tank 61, which may contain substantially clean water 62 adapted to rinse from the surface of web 1 any cleaning solution 53 remaining thereon. Web 1 may pass thence over rolls 63 and 64, thence between radiant heating units 65 and 66 adapted to dry the web, thence over direction-changing roll 67 and unto windup roll 68.

The particular sequence of washing, brushing, rinsing and drying operations is important in providing a suitable finished material, but is not a part of the invention claimed hereinafter. Either of rotating brushes 54 may be omitted and if desired the single remaining rotating brush may be provided with a backup roll to back up web 1 in a manner similar to that in which roll 26 backs up web 1 against brush 25. If desired it is often suitable to conduct all or part of the brushing operations in the rinse tank rather than in the wash tank, but the web may be mechanically brushed both in the wash tank and in the rinse tank. Drying units 65 and 66 have been illustrated as each comprising a plurality of radiant bars 70 which may consist of electrically resistive material having electrical current passed therethrough, provided with reflectors 71, but any suitable drying means such as, for example, a tunnel or oven having hot or room temperature air blown therethrough may suitably be used. Any suitable means may be provided for driving elevators 32 and 33, screw conveyors 30 and 31, wind-up roll 68, brushes 54 and 55 and roller 19 or roller 20; for the sake of simplicity such driving means have been omitted from the figures.

Figure 4:
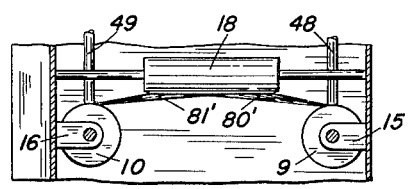
FIGURE 4 is a cross-sectional view corresponding to FIGURE 3 but showing another embodiment.

The arrangement of throwing wheels and the operation of these wheels with abrasive granules to provide a suitable subbing surface on sheets or webs comprising synthetic resin has not been possible heretofore. We have found that by placing the wheels in such manner that the axes thereof are beyond the edges of the web and the angle at which the abrasive granules strike the surface of the web is less than 60° (as shown in FIGURES 3 and 4) an excellent subbing surface can be obtained. Wheels placed in this manner may be operated so that the streams 80 and 81 of granules cross each other, that is, the stream 80 of granules passing from wheel 9 strikes that portion of the under-surface of web 1 most remote from wheel 9 whereas stream 81 passing from wheel 10 strikes that portion of the under-surface of web 1 most remote from wheel 10. On the other hand, as shown in FIGURE 4, the equipment may be so arranged and operated that stream 80' passing from wheel 9 strikes that portion of the underside of web 1 closest to wheel 9 and likewise stream 81' passing from wheel 10 strikes that portion of the under-surface of web 1 nearest wheel 10.

Certain types of granules have been mentioned as being suitable. It is generally preferable to use aluminum oxide or Carborundum granules. It is slightly more diffi-
cult to provide a clean surface of the type desired with Carborundum granules due to their darker color. Granules of silica sand or powdered glass may be used but equal results are not obtained because of differences in hardness and density.

Steel particles or granules and steel shot cannot suitably be used. Steel shot and steel particles or powder of different sizes from 80 mesh to 320 mesh have all proved entirely unsuitable. These granules chip the surface of the web, imbed themselves in the surface of the web, tend to destroy the web and generally produce unsatisfactory surface characteristics. Ground or comminuted walnut shells, corn cobs, peach pits and other vegetable matter may be suitably used but the velocity with which such particles are projected or hurled against the surface must be extremely high due to their very low density. When such materials are thrown with a wheel having a diameter of 18 inches rotating at 1750 to 1800 r.p.m. a matte surface is not provided in accordance with the invention.

Aluminum oxide and Carborundum granules are preferably of 80 mesh, 100 mesh or 120 mesh to produce matte surfaces according to the invention. The mesh size given refers to the commercial mesh size, that is, all the granules in a specimen of 80 mesh material will pass through an 80 mesh screen. Many of the granules contained in such a specimen are smaller than 80 mesh and will pass through a smaller screen but generally at least over 50% will not pass through the next smaller size screen, namely a 100-mesh screen. For some purposes granules as large as 60 mesh or as small as 160 mesh are usable but the range of 80 to 120 mesh granules are preferred for the invention, where the mesh size of the granules is the nominal or commercial size and is taken as indicating a specimen of abrasive of which all granules pass through a screen of the size indicated and at least 50% do not pass through the screen of the next smaller size. Since a 140-mesh screen is the next smaller size, such granules may better be defined as those substantially between 80 and 140 mesh in size.

Generally the materials aluminum oxide and Carborundum may be referred to as ceramics and at least for purposes of this invention the term ceramic is used to refer to these two materials and to other materials such as silica and silicates which are well known as being ceramics.

The ceramic granules referred to above as being preferred if between 80 and 140 mesh in size may be utilized to obtain matte surfaces with various roughnesses if hurled with an initial speed of 8000 to 8500 feet per minute, which may be obtained by rotating an 18-inch diameter wheel at 1700 to 1800 r.p.m. At lower speeds their effectiveness is reduced and an unsatisfactory surface or a surface having no matte properties at all is obtained. Higher speeds of projection or hurling may suitably be used and in this event smaller sized granules may be suitably utilized. The particular size granules may be selected from the preferred range to give a surface of the desired degree of matte or roughness depending on the thickness and hardness of the web, the toughness of resin therein and the roughness of surface desired. The use of ceramic granules of 80 to 120 mesh nominal size produces a preferred range of surface roughnesses on thin webs comprising thermosetting polyester synthetic resins or phenol formaldehyde thermosetting synthetic resins having thicknesses of less than about .050 inch and webs of .00025 to .005 inch thickness comprising a thermoplastic polyester synthetic resin, more particularly polyethylene terephthalate.

After providing a subbing surface on a sheet of material suitable for drafing reproduction purposes which may be generally defined as a sheet of light-transmitting flexible material for carrying a highly precise image which may be copied, it may be desirable to use this surface directly as a "pencil surface," that is, as a surface adapted to be receptive to pencil lines and to retain the graphite from a lead pencil thereon and the form of the image drawn thereupon rather than to coat it with a subbing coat and additional coats. However, for reproduction purposes it is generally necessary to apply one or more sensitized subbing coatings and sensitized coatings. Polyester resins are particularly suitable for this purpose and although a thermoplastic polyester resin, preferably polyethylene terephthalate, may be used, a thermosetting polyester resin is generally particularly well suited and the polyester resins suitable for this purpose are the polymerization product of a mixture of a compound having a single terminal ethylenic group $CH_2=C<$ with an unsaturated alkyd resin which is the reaction product of an ethylenic-alpha-beta dicarboxylic acid with a glycol. These ingredients are reacted in such proportions that there are present in the reacting mixture about one carboxyl group in such unsaturated acid to one hydroxyl group in such glycol to an advanced stage of esterification, but short of becoming completely insoluble and infusible, until a product of low acid number is produced which is soluble in a liquid monomeric unsaturated polymerizable compound containing an ethylenic linkage. This product of esterification is mixed with a liquid monomeric unsaturated polymerizable compound containing an ethylenic linkage. Glass or cotton fabric or a non-woven fibrous web may then be impregnated with this solution and the solution may then be subjected to conjoint polymerization in the absence of air to form an insoluble, infusible resin filling the interstices of the glass fabric.

Probably the best commercial example of these resins is the resin formed from a mixture of styrene with diethylene glycol maleate or maleatefumarate. However, compounds other than styrene which have a single terminal ethylenic group may be used; e.g. alpha substituted ethylene compounds of the general formula $CH_2=CR_1R_2$ where $R_1$ is a negative group such as aryl, vinyl, carboxyl, halogeno, O—CO-alkyl (acyloxy), CO.O. alkyl (carbalkoxy), alkoxy, aldehyde, nitrilo or halovinyl, and $R_2$ is hydrogen or an alkyl group.

These compounds are in contrast with the unsaturated polybasic acids used to form the polyester resins which acids may be defined as ethylene alpha-beta dicarboxylic acids. In addition to maleic acid or anhydride, fumaric acid, itaconic acid and citraconic acids and anhydrides may be used. The dihydric alcohol or glycol may be diethylene glycol, ethylene glycol, triethylene glycol, trimethylene glycol, monoethylin, or propylene glycol and its derivatives. The dicarboxylic acids and dihydric alcohols form chain compounds which may be termed "linear polyesters."

In the final cure the linear molecule is converted by the substituted-ethylene body with which it is mixed to a molecule of the 3-dimensional type (insoluble and infusible) by some form of cross-linkage between the linear molecules. The cross-linkage causing cure is believed to be a copolymerization between the unsaturated alkyd resin and the monomeric resin forming body.

For purposes other than providing a flexible sheet for curing a precise image which may be copied, other resins may equally well be used. These may include thermosetting melamine formaldehyde resins, thermosetting urea formaldehyde resins, thermosetting phenol formaldehyde resins, and generally thermosetting polymers of compounds containing active amine or phenol groups with formaldehyde or formaldehyde-generating compounds such as hexamethylene tetramine. Thermoplastic resinous webs may also be treated according to the invention although modification of the process may be necessary for this purpose and the results obtained are generally not equally desirable. Such resins may include polymethyl methacrylate, polyvinyl acetate, polyvinyl chloride-acetate, polyvinyl chloride, polyvinylidene chloride, cellulose acetate, cellulose acetate butyrate, etc.

In addition to subbing surfaces the invention is suitable for providing surfaces having generally matte or deglossed properties, surfaces having increased coefficients of friction, surfaces having improved adherence to laminating adhesives and other adhesives and for other applications wherein a roughened or matte surface is desirable on a synthetic resin web.

Having thus disclosed our invention, we claim:

The method of providing a matte surface on a continuous web of a heat softenable synthetic resin comprising the steps of continuously advancing the web in one direction while in a horizontal position, continuously centrifugally hurling abrasive granules from beneath the web upwardly against the underside of the horizontally disposed web at an angle less than 60° with the horizontal while backing the opposite top side of the web whereby the abrasive particles strike the surface of the web at an angle and glance off in a direction away from the hurled abrasive granules, continuously engaging the underside of the web with a brush to dislodge abrasive granules retained on the underside of the web, engaging the top side of the web with a continuous stream of air for displacement of abrasive granules coming to rest on the top side of the web, and then continuously washing and drying the web.

References Cited in the file of this patent

UNITED STATES PATENTS

| | | |
|---|---|---|
| 293,011 | Hall et al. | Feb. 4, 1884 |
| 2,034,308 | Morgan | Mar. 17, 1936 |
| 2,204,588 | Guite | June 18, 1940 |
| 2,448,316 | Lesavoy | Aug. 31, 1948 |